US008987400B2

(12) United States Patent
Gloger et al.

(10) Patent No.: US 8,987,400 B2
(45) Date of Patent: Mar. 24, 2015

(54) BOPP-FILM (75) Inventors: Dietrich Gloger, Linz (AT); Katja Klimke, Linz (AT); Joachim Fiebig, St. Marien (AT)

(73) Assignee: Borealis AG, Vienna (AT)

( * ) Notice: Subject to any disclaimer, the term of this patent is extended or adjusted under 35 U.S.C. 154(b) by 438 days.

(21) Appl. No.: 13/519,630

(22) PCT Filed: Dec. 21, 2010

(86) PCT No.: PCT/EP2010/070326
§ 371 (c)(1),
(2), (4) Date: Aug. 30, 2012

(87) PCT Pub. No.: WO2011/080153
PCT Pub. Date: Jul. 7, 2011

(65) Prior Publication Data
US 2012/0329951 A1 Dec. 27, 2012

(30) Foreign Application Priority Data
Dec. 30, 2009 (EP) .................. 09181011

(51) Int. Cl.
C08F 10/06 (2006.01)
C08F 110/06 (2006.01)
C08F 10/00 (2006.01)
H01B 3/44 (2006.01)
C08L 23/12 (2006.01)
C08F 4/76 (2006.01)
C08F 4/659 (2006.01)

(52) U.S. Cl.
CPC .............. *C08F 110/06* (2013.01); *C08F 10/00* (2013.01); *H01B 3/441* (2013.01); *C08L 23/12* (2013.01); *C08F 10/06* (2013.01); *C08F 2500/00* (2013.01); *C08F 4/76* (2013.01); *C08F 4/65912* (2013.01); *C08F 2410/01* (2013.01)
USPC ............ 526/351; 526/192; 526/237; 526/348

(58) Field of Classification Search
CPC ...... C08F 10/06; C08F 110/06; C08F 210/06; C08L 23/12
USPC .................................. 526/348, 351
See application file for complete search history.

(56) References Cited

FOREIGN PATENT DOCUMENTS

| EP | 0887379 A1 | 12/1998 |
| EP | 1883080 A1 | 1/2008 |
| EP | 1990353 A1 | 11/2008 |
| WO | 9212182 A1 | 7/1992 |
| WO | WO 9212182 A1 | 7/1992 |
| WO | 9428034 A1 | 12/1994 |

(Continued)

OTHER PUBLICATIONS

International Search Report for International Application No. PCT/EP2010/070326 Filed on Dec. 21, 2010.

(Continued)

*Primary Examiner* — Richard A Huhn
(74) *Attorney, Agent, or Firm* — Warn Partners, P.C.

(57) ABSTRACT

Polypropylene having a melting temperature ($T_m$) of at least 151.0° C., a melt flow rate $MFR_2$ (230° C.) of more than 2.0 g/10 min, a xylene cold soluble fraction (XCS) of not more than 1.5 wt.-%, <2,1> regiodefects of equal or more than 0.4 mol.-% determined by $^{13}C$-spectroscopy, and a number average molecular weight (Mn) of not more than 110 kg/mol.

16 Claims, 1 Drawing Sheet

Figure 1:
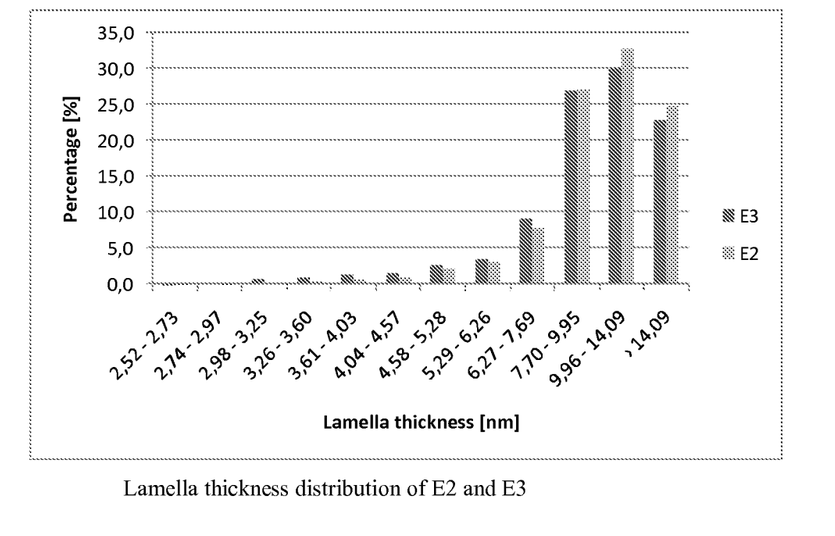

Lamella thickness distribution of E2 and E3

(56) References Cited

FOREIGN PATENT DOCUMENTS

| WO | WO 9428034 A1 | 12/1994 |
| WO | 9722633 A1 | 6/1997 |
| WO | WO 9722633 A1 | 6/1997 |
| WO | 0148034 A2 | 7/2001 |
| WO | WO 0148034 A2 | 7/2001 |
| WO | 0216455 A1 | 2/2002 |
| WO | WO 0216455 A1 | 2/2002 |
| WO | 03051934 A2 | 6/2003 |
| WO | WO 03051934 A2 | 6/2003 |
| WO | 2008006529 A1 | 1/2008 |
| WO | WO 2008006529 A1 | 1/2008 |
| WO | 2008135598 A1 | 11/2008 |
| WO | WO 2008135598 A1 | 11/2008 |

OTHER PUBLICATIONS

International Search Report and Written Opinion for International Application No. PCT/EP2010/070326 Filed on Dec. 21, 2010.
Vincenzo Busico, et al., Full Assignment of the 13C NMR Spectra of Regioregular Polypropylenes: Methyl and Methylene Region, Macromolecules, 1997, 30, pp. 6251-6263.
Zhe Zhou, et al., A New Decoupling Method for Accurate Quantification of Polyethylene Copolymer Composition & Triad Sequence Distribution with 13 C NMR, Science Direct, 2007.
Vincenzo Busico, et al., Alk-1-ene Polymerization in the Presence of a Monocyclopentadienyl Zirconium (IV) Acetamidinate Catalyst, Macromolecular Rapid Communication, 2007.
Wen-Jun Wang & Shiping Zhu, Structural Analysis of Ethylene/Propylene Copolymers Synthesized with a Constrained Geometry Catalyst, Macromolecules, 2000, 33, 1157-1162.
H. N. Cheng, 13C NMR Analysis of Ethylene-Propylene Rubbers, Macromolecules, 1984, 17, pp. 1950-1955.
Masahiro Kakugo, et al., 13C NMR Determination of Monomer Sequence Distribution in Ethylene-Propylene Copolymers, Macromolecules, 1982. 15, pp. 1150-1152.
Greg Saunders, et al., Use of Rapid Triple Detection Size Exclusion Chromatography to Evaluate the Evolution of Molar Mass . . . , Macromolecules, 2005, 38, 6418-6422.
James C. Randall, A review of High Resolution Liquid 13Carbon Nuclear Magnetic Resonance Characterizations of Ethylene-Based Polymers, Macromolecular, 1989,C29 (2&3), 201-317.
Luigi Resconi, et al., Selectively in Propene Polymerization with Metallocene Catalysts, Chem. Rev., Mar. 25, 2000, 100,. pp. 1253-1345, American Chemical Society.
Vincenzo Busico, Roberta Cipullo, Microstructure of Polypropylene, Progress in Polymer Science, 2001, pp. 443-533, Elsevier Science Ltd.

Lamella thickness distribution of E2 and E3

BOPP-FILM

CROSS REFERENCE TO RELATED APPLICATIONS

This application is a National Stage of International Application No. PCT/EP2010/070326, filed Dec. 21, 2010. This application claims priority to European Patent Application No. 09181011.9 filed on Dec. 30, 2009. The disclosures of the above applications are incorporated herein by reference.

The present invention relates to a new polypropylene and an capacitor film made from said polypropylene, as well as the preparation of said polypropylene.

Capacitor films must withstand extreme conditions like high temperatures and high electrical breakdown strength. Additionally it is appreciated that capacitor films possess good mechanical properties like a high stiffness and/or temperature resistance. Up to now there is the prevailing opinion in the technical field of capacitor technology that high electrical breakdown strength can be only achieved with a low level of electrical conduction caused by residual metals such as titanium, aluminum and chlorine. However traditional polypropylenes produced with a Ziegler-Natta catalyst are contaminated with high amounts of residual catalyst components. To achieve the desired very low levels of impurities to make the polypropylene suitable for capacitor films, the polypropylenes must be troublesome washed, a process which is time consuming and cost-intensive. To overcome the washing step polypropylenes produced in the presence of supported single-site catalysts have been developed, as for instance described in WO 02/16455 A1, with low levels of impurities including metallic and non-metallic impurities, like aluminum, titanium, and halogen (such as Cl and F). However the silicon content is still undesirable high. The European applications EP 1 883 080 and EP 1 990 353 provide alternative approaches for capacitor films compared to the before mentioned international application. The polypropylene of said applications have quite promising electrical breakdown behavior, however the silicon residue content is relatively high. Further the temperature performance and stiffness behavior of said material could be still improved.

Therefore the object of the present invention is to provide a polypropylene and/or a capacitor film withstanding a high electric field strength without causing failure of the same and said polypropylene and/or said film having in particular good temperature resistance and stiffness.

The present invention is based on the finding that a capacitor with promising electrical breakdown strength and good temperature performance is only achievable with a polypropylene featured by a rather high amount of a fraction with rather high amount of thick lamella.

Accordingly the present invention is directed to a polypropylene having (a) a melting temperature $(T_m)$ measured according to ISO 11357-3 of at least 151.0° C.,
(b) a melt flow rate $MFR_2$ (230° C.) measured according to ISO 1133 of more than 2.0 g/10 min,
(c) a xylene cold soluble fraction (XCS) measured according to ISO 6427 at 23° C. of not more than 1.5 wt.-%, and
(d) at least 18.0 wt-%, more preferably at least 20.0 wt.-%, yet more preferably at least 22.0 wt.-%, still yet more preferably at least 23.0 wt.-%, of a crystalline fraction having a lamella thickness of more than 14.09 nm, wherein said fraction is determined by the stepwise isothermal segregation technique (SIST).

Accordingly the present invention according to the first aspect is in particular directed to a polypropylene having (a) a melting temperature $(T_m)$ measured according to ISO 11357-3 of at least 151.0° C.,
(b) a melt flow rate $MFR_2$ (230° C.) measured according to ISO 1133 of more than 2.0 g/10 min,
(c) a xylene cold soluble fraction (XCS) measured according to ISO 6427 at 23° C. of not more than 1.5 wt.-%, and
(d) at least 18.0 wt-%, more preferably at least 20.0 wt.-%, yet more preferably at least 22.0 wt.-%, still yet more preferably at least 23.0 wt.-%, of a crystalline fraction having a lamella thickness of more than 14.09 nm, wherein said fraction is determined by the stepwise isothermal segregation technique (SIST), wherein
  (i) the polypropylene is melted at 225° C. for 5 min.,
  (ii) then cooled with 80° C./min to 145° C.,
  (iii) held for 2 hours at 145° C.,
  (iv) then cooled with 80° C./min to 135° C.,
  (v) held for 2 hours at 135° C.,
  (vi) then cooled with 80° C./min to 125° C.,
  (vii) held for 2 hours at 125° C.,
  (viii) then cooled with 80° C./min to 115° C.,
  (ix) held for 2 hours at 115° C.,
  (x) then cooled with 80° C./min to 105° C.,
  (xi) held for 2 hours at 105° C.,
  (xii) then cooled down with 80° C./min to −10° C. and
  (xiii) then heated at a heating rate of 10° C./min up to 200° C. obtaining a melting curve of said polypropylene, said melting curve in the temperature range of 50 to 200° C. is used to calculate the lamella thickness distribution according to Thomson-Gibbs equation (Eq 1.)

$$T_m = T_0\left(1 - \frac{2\sigma}{\Delta H_0 \cdot L}\right) \quad (1)$$

wherein
$T_0 = 457$ K,
$\Delta H_0 = 134 \times 10^6$ J/m$^3$,
$\sigma = 0.0496$ J/m$^2$,
$T_m$ is the measured temperature (K) and
L is the lamella thickness (nm).

Further the polypropylene according to the first aspect has preferably a number average molecular weight (Mn) measured according to ISO 16014-4:2003 of not more than 100 kg/mol.

Alternatively the present invention is defined in a second aspect to a polypropylene having (a) a melting temperature $(T_m)$ measured according to ISO 11357-3 of at least 151.0° C.,
(b) a melt flow rate $MFR_2$ (230° C.) measured according to ISO 1133 of more than 2.0 g/10 min,
(c) a xylene cold soluble fraction (XCS) measured according to ISO 6427 at 23° C. of not more than 1.5 wt.-%, and
(d) a number average molecular weight (Mn) measured according to ISO 16014-4:2003 of not more than 100 kg/mol.

Further the polypropylene according to the second aspect has preferably at least 18.0 wt-%, more preferably at least 20.0 wt.-%, yet more preferably at least 22.0 wt.-%, still yet more preferably at least 23.0 wt.-%, of a crystalline fraction having a lamella thickness of more than 14.09 nm wherein said fraction is determined by the stepwise isothermal segregation technique (SIST). The fraction is in particular determined as described for the first aspect of the present invention.

It has surprisingly found that polypropylene according to the first and/or second aspect of the present invention makes it possible to obtain capacitor films with good electrical breakdown having also a high temperature resistance and good mechanical stiffness in terms of tensile modulus (see tables).

In the following the present invention is described in more detail.

The instant polypropylene can be any polypropylene, however it is preferred that it is a random propylene copolymer or a propylene homopolymer, the latter is especially preferred.

The term "random copolymer" has to be preferably understood according to IUPAC, i.e. as a polymer in which the probability of finding a given monomeric unit at any given site in the polymer chain is independent.

In case the polypropylene is a random propylene copolymer it comprises monomers copolymerizable with propylene, for example comonomers such as ethylene and/or $C_4$ to $C_{20}$ alpha-olefins, in particular ethylene and/or $C_4$ to $C_{10}$ alpha-olefins, e.g. 1-butene and/or 1-hexene. Preferably the random propylene copolymer comprises, especially consist of, monomers copolymerizable with propylene from the group consisting of ethylene, 1-butene and 1-hexene. More specifically the random propylene copolymer comprises—apart from propylene—units derivable from ethylene and/or 1-butene. In a preferred embodiment the random propylene copolymer comprises units derivable from ethylene and propylene only. The comonomer content in the random propylene copolymer is preferably relatively low, i.e. up to 6.0 wt.-%, more preferably 0.5 to 6.0 wt.-%, still more preferably 0.5 to 4.0 wt.-%, yet more preferably 0.5 to 2.0 wt.-%.

The expression homopolymer used in the instant invention relates to a polypropylene that consists substantially, i.e. of at least 99 wt.-%, preferably of at least 99.5 wt.-%, more preferably of at least 99.8 wt.-%, of propylene units. In a preferred embodiment only propylene units in the propylene homopolymer are detectable.

Preferably the polypropylene is isotactic. Accordingly it is appreciated that the polypropylene has a rather high pentad concentration, i.e. higher than 90%, more preferably higher than 92%, still more preferably higher than 93% and yet more preferably higher than 95%, like higher than 99%.

Commercially available polypropylenes in principle useful for capacitors are featured by rather high xylene cold soluble (XCS) content. The polypropylene of the instant invention is featured by rather low xylene cold soluble (XCS) content, i.e. by a xylene cold soluble (XCS) content of below 1.5 wt.-%, more preferably of below 1.4 wt.-%. Thus it is in particular appreciated that the polypropylene of the instant invention has a xylene cold soluble (XCS) content in the range of 0.3 to 1.4 wt.-%, more preferably in the range of 0.3 to 1.4 wt.-%.

The amount of xylene cold soluble (XCS) additionally indicates that the polypropylene composition is preferably free of any elastomeric polymer component, like an ethylene propylene rubber. In other words the polypropylene shall be not a heterophasic polypropylene, i.e. a system consisting of a polypropylene matrix in which an elastomeric phase is dispersed. Such systems are featured by a rather high xylene cold soluble content.

The polypropylene of the present invention is preferably obtained by a catalyst system as defined in detail below. Accordingly the polypropylene has been not produced in the presence of a Ziegler-Natta catalyst. Typically the polypropylenes obtained by different catalyst types differ also essentially in their <2,1> regiodefects. Accordingly it is appreciated that the polypropylene has <2,1> regiodefects determined by $^{13}C$-spectroscopy of equal or more than 0.4 mol.-%, more preferably of equal or more than 0.6 mol.-%, like in the range of 0.7 to 0.9 mol.-%.

A further essential aspect of the instant invention is that the polypropylene has a rather high melting point. Accordingly it is appreciated that the polypropylene according to this invention has a melting temperature ($T_m$) measured according to ISO 11357-3 of at least 151.0° C., more preferably of at least 152° C. An upper melting point is equal or below 160° C., preferably equal or below 159° C. Thus it is in particular appreciated that the melting temperature ($T_m$) measured according to ISO 11357-3 of the polypropylene is in the range of 151 to 160° C., more preferably in the range of 151 to 155° C., yet more preferably in the range of 152 to 159° C., and still more preferably in the range of 152 to 155° C.

Additionally it is appreciated that the polypropylene of the instant invention has rather high crystallization temperature ($T_c$). Thus it is preferred that the polypropylene has crystallization temperature ($T_c$) measured according to ISO 11357-3 of at least 110° C., more preferably of at least 111° C. Accordingly the polypropylene has preferably a crystallization temperature ($T_c$) measured according to ISO 11357-3 in the range of 110 to 120° C., more preferably in the range of 111 to 117° C.

A further requirement of the present invention is that the polypropylene has rather high melt flow rate (MFR). It is one finding of the present invention that with higher melt flow rates the amount of undesired residues within the polypropylene can be significantly lowered. The melt flow rate measured under a load of 2.16 kg at 230° C. (ISO 1133) is denoted as $MFR_2$ (230° C.). Accordingly, it is preferred that in the present invention the polypropylene has an $MFR_2$ (230° C.) of more than 2.0 g/10 min, more preferably of more than 3.0 g/10 min. Accordingly it is appreciated that the $MFR_2$ (230° C.) measured according to ISO 1133 is in the range of 2.0 to 10.0 g/10 min, more preferably in the range of 2.0 to 9.0 g/10 min, like in the range of 2.3 to 8.5 g/10 min.

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. The number average molecular weight (Mn) is very sensitive to changes in the weight fractions of low molecular weight species. In turn, the weight average molecular weight (Mw) is the first moment of a plot of the weight of polymer in each molecular weight range against molecular weight. The weight average molecular weight (Mw) is very sensitive to changes in number of large molecules in a given sample of a polymer. Finally the z-average molecular weight (Mz) gives information about the very high molecular weight species of the polymer. Further the molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$). The z-average molecular weight ($M_z$), the number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

A finding of the present invention is that a good balance between excellent breakdown voltage and temperature resistance can be obtained by a polypropylene with rather low content of the number average molecular weight (Mn). Accordingly it is appreciated that the polypropylene of the present invention has a number average molecular weight (Mn) measured according to ISO 16014-4:2003 of not more than 110 kg/mol, preferably of not more than 100 kg/mol, more preferably in the range of 40 to 120 kg/mol, yet more preferably in the range of 60 to 100 kg/mol, like 70 to 90 kg/mol.

Further the z-average molecular weight ($M_z$) measured according to ISO 16014 of the polypropylene is preferably below 800 kg/mol, more preferably not more than 700 kg/mol, still more preferably in the range of 300 to 800 kg/mol, like 320 to 650 kg/mol.

Accordingly it is appreciated that the polypropylene according to the instant invention has an Mz/Mn-ratio [(kg/mol)/(kg/mol)] of below 8 more preferably in the range of 7 to 4 wherein the z-average molecular weight ($M_y$) and the number average molecular weight ($M_n$) are measured according to ISO 16014-4:2003.

Further it is preferred that the inventive polypropylene has a weight average molecular weight ($M_w$) from 100 to 600 kg/mol, more preferably from 200 to 500 kg/mol. Accordingly in a preferred embodiment the inventive polypropylene has a Mz/Mw-ratio [(kg/mol)/(kg/mol)] of below 3.0, more preferably of below 2.2, yet more preferably in the range of 1.2 to 3.0, like 1.5 to 2.3.

A broad molecular weight distribution (MWD) improves the processability of the polypropylene. Accordingly it is appreciated that the molecular weight distribution (MWD) measured according to ISO 16014 is at least 2.0, more preferably at least 2.3, like 2.5. On the other hand a rather broad molecular weight distribution (MWD) indicates rather high amount of low molecular weight fractions which contribute to the xylene soluble content without improving the dielectrical performance. Therefore, in an alternative embodiment the molecular weight distribution (MWD) is preferably between 2.0 to 6.0, still more preferably in the range of 2.2 to 5.0, like 2.2 to 4.0, yet more preferably in the range of 2.5 to 4.5.

The polypropylene can be further unimodal or multimodal, like bimodal in view of the molecular weight distribution and/or the comonomer content distribution.

The expression "multimodal" or "bimodal" used herein refers to the modality of the polymer, i.e.

the form of its molecular weight distribution curve, which is the graph of the molecular weight fraction as a function of its molecular weight, or the form of its comonomer content distribution curve, which is the graph of the comonomer content as a function of the molecular weight of the polymer fractions.

Accordingly in case the polypropylene of the instant invention is multimodal, like bimodal, may comprise different polypropylene fractions. Such a polypropylene is either obtainable, preferably obtained, by mechanical blending or by a sequential polymerization process as will be explained in detail below. Therefore in case the polypropylen is of multimodal, like bimodal, it comprises at least two different polypropylenes. It is in particular preferred that the polypropylene—if it is not unimodal—is multimodal, like bimodal, in view of its molecular weight distribution curve. Accordingly the polypropylene of the instant invention may comprise at least two fractions having different melt flow rates and/or different number average molecular weights (Mn). Even more preferred the polypropylene comprises first polypropylene (fraction) having a lower MFR$_2$ (230° C.) and/or higher Mn value than the second polypropylene (fraction). Thus in a specific embodiment, in case the polypropylene is not unimodal, said polypropylene comprises at least two polypropylene (fractions), namely (a) a first polypropylene having
 (i) a melt flow rate MFR$_2$ (230° C.) measured according to ISO 1133 of below 5.0 g/10 min, preferably of below 3.0 g/10 min, more preferably in the range of 0.3 to 5.0 g/10 min, yet more preferably in the range of 0.5 g/10 min,
 and/or
 (ii) a number average molecular weight (Mn) measured according to ISO 16014-4:2003 of at least 95 kg/mol, preferably of at least 100 kg/mol, more preferably in the range of 95 to 125 kg/mol, yet more preferably in the range of 100 to 120 kg/mol, and (b) a second polypropylene having
 (i) a melt flow rate MFR$_2$ (230° C.) measured according to ISO 1133 of at least 5.0 g/10 min, preferably of at least 7.0 g/10 min, more preferably in the range of more 5.5 to 250.0 g/10 min, yet more preferably in the range of 6.0 to 150 g/10 min,
 and/or
 (ii) a number average molecular weight (Mn) measured according to ISO 16014-4:2003 of below 95 kg/mol, preferably of below 90 kg/mol, more preferably in the range of 25 to below 95 kg/mol, yet more preferably in the range of 30 to 90 kg/mol.

The stepwise isothermal segregation technique (SIST) provides a possibility to determine the lamellar thickness distribution. The precise measuring method is specified in the example section (in particular the definition of the lamella thickness of each fraction and its melt enthalpy). Thereby rather high amounts (rather high melt enthalpy [J/g]) of polymer fractions crystallizing at high temperatures indicate a rather high amount of thick lamellae. Thus it is appreciated that the polypropylene comprises at least 18.0 wt-%, more preferably at least 20.0 wt.-%, yet more preferably at least 22.0 wt.-%, still yet more preferably at least 23.0 wt.-%, of a crystalline fraction having a lamella thickness of more than 14.09 nm, wherein said fraction is determined by the stepwise isothermal segregation technique (SIST). It is especially preferred that the polypropylene comprises 18.0 to 50.0 wt-%, more preferably 20.0 to 45.0 wt.-%, yet more preferably 21.0 to 40.0 wt.-%, still more preferably 22.0 to 35.0 wt.-%, of a crystalline fraction having a lamella thickness of more than 14.09 nm, wherein said fraction is determined by the stepwise isothermal segregation technique (SIST).

Additionally it is appreciated that the polypropylene comprises not more than 66.0 wt.-%, more preferably not more than 64.0 wt.-%, like 63.0 wt.-%, of a crystalline fraction having a lamella thickness in the range of 7.70 to 14.09 nm. Thus it is appreciated that the polypropylene according to this invention comprises a crystalline fraction having a lamella thickness in the range of 7.70 to 14.09 nm in the amount of 55.0 to 66.0 wt.-%, more preferably in the amount of 56.0 to 65.0 wt.-%, like 57.0 to 64.0 wt.-%.

Further it is desired that the polypropylene comprises more than 12.0 wt.-%, more preferably more than 13.0 wt.-%, like more than 14.0 wt.-%, of a crystalline fraction having a lamella thickness in the range of 2.52 to 7.69 nm. Thus it is appreciated that the polypropylene according to this invention comprises a crystalline fraction having a lamella thickness in the range of 2.52 to 7.69 nm in the amount of 12.0 to 20.0 wt.-%, more preferably in the amount of 13.0 to 19.0 wt.-%, like in the amount of 13.0 to 18.0 wt.-%.

Further it is appreciated that the polypropylene is of linear structure and thus does not show (or nearby does not show) a kind of branching. Accordingly it is appreciated that the polypropylene of the instant invention has preferably a branching index g' of not less than 0.9, preferably more than 0.9, like at least 0.95. In other words if the polypropylene has some kind of branching it shall be rather moderate. Accordingly the branching index g' of the polypropylene is preferably in the range of 0.9 to 1.0, more preferably in the range of more than 0.9 to 1.0, like in the range of 0.96 to 1.0. In an especially preferred embodiment the polypropylene shows no branching, i.e. the polypropylene has a branching index g' of 1.0. The branching index g' is defined as g'=$[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±3%) as the branched polypropylene. Thereby, a low g'-value is an indicator for a high branched polymer. In other words, if the g'-value decreases, the branching of the polypropylene increases. The exact determination of the g'-value is specified in the example section.

As the polypropylene according to this invention is preferably of non-branched structure it does also not show a significant amount of gel content. Gels are a typical phenomena of polypropylenes being crosslinked. Thus the gel content is a good indicator for the chemical modification of the polypropylene. Accordingly the polypropylene of the present invention is featured by relatively moderate gel content, i.e. of not more than 0.50 wt.-%, more preferably of not more than 0.25 wt.-%, still more preferably of not more than 0.15 wt.-%, like below 0.15 wt.-%, yet more preferably not more than 0.10 wt.-%, determined as the relative amount of polymer insoluble in boiling xylene (xylene hot insoluble fraction, XHI). In an especially preferred embodiment no gel content is detectable.

An special finding of the present invention is, that the polypropylene has very good electrical breakdown values, even though the material has not purified by troublesome washing steps. Thus the polypropylene has preferably an ash content measured according to ISO 3451-1 (1997) in the range of 50 to 80 ppm, more preferably in the range of 53 to 77 ppm, like in the range of 53 to 72 ppm.

Even though the ash content can be comparatively high in the inventive polypropylene compared to commercial products in this technical filed it has no detrimental impact on the electrical breakdown behaviour. Without be bonded on the theory, the reason might be the constitution of the ash, i.e. the individual residues of the ash. Compared to other polypropylenes the ash is essential free of titanium, chlorine, silicone and/or magnesium.

As will be described in detail below the polypropylene of the instant invention is obtainable by the use of a specific metallocene catalyst system. Accordingly the polypropylene of the instant invention has been not produced by a Ziegler-Natta catalyst. Thus it is further preferred that the titanium (Ti) residue content within the polypropylene is preferably below 10 ppm, more preferably below 5 ppm, still more preferably below 1.2 ppm, even more preferred titanium (Ti) is not detectable, measured according to ISO 3451-1 (1997).

Further as the catalyst used in the above defined process is non-supported, it is preferred that the silicon (Si) residue content measured according to ISO 3451-1 (1997) within the polypropylene is below 10 ppm, more preferably below 5 ppm, yet more preferably below 1.2 ppm, like below 1 ppm. In a specific embodiment no silicon (Si) within the polypropylene is detectable Additionally it is appreciated that the a magnesium (Mg) residue content measured according to ISO 3451-1 (1997) is of not more than 5 ppm, preferably below 1.0 ppm, still more preferably below 0.5 ppm, yet more preferably not detectable according to the applied measuring method and/or the chlorine (Cl) residue content measured according to ISO 3451-1 (1997) is of not more than 5 ppm, preferably below 1.0 ppm, still more preferably below 0.5 ppm, yet more preferably not detectable according to the applied measuring method.

Finally it is appreciated that the polypropylene according to the instant invention has an electrical breakdown strength (EB63%, AC, 50 Hz) according to IEC 60243-part 1 (1988) of at least 300 kV/mm at a draw ratio in machine direction and in transverse direction of 5.0.

The polypropylene may comprise additives known in the art, like antioxidants. However any additives which negatively influences the electrical breakdown behavior should be avoided.

The present invention is not only directed to the polypropylene as such but also to its use. Accordingly the polypropylene is preferably used as biaxially oriented film and/or as a capacitor film.

Further the invention is also directed to a biaxially oriented polypropylene film, wherein the polypropylene is a polypropylene as defined in the present invention. Additionally the polypropylene of the instant invention can be employed in capacitor films. In such cases the capacitor film comprises at least 80 wt.-%, more preferably at least 90 wt.-%, yet more preferably at least 99 wt.-%. In an especially preferred embodiment the capacitor film consists of the polypropylene according to this invention. Further preferred the capacitor film is a biaxially oriented polypropylene film according to this invention.

In the following the preparation of the inventive polypropylene is described in more detail.

The polypropylene of this invention has been in particular obtained by a new catalyst system having a surface area measured according to ASTM D 3663 of below 20 m²/g and comprising a catalyst being the transition metal compound of formula (I)

$(Cp)_2RZrX_2$             (I)

wherein

X is independently a monovalent anionic ligand, such as a σ-ligand,

Cp is an organic ligand selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
with the proviso that both Cp-ligands are selected from the above stated group and both Cp-ligands are chemically the same, i.e. are identical R is a bridging group linking the two Cp ligands, wherein R has the formula (II)

—Y(R')$_2$—             (II)

wherein

Y is C, Si or Ge, preferably Si,

R' is $C_1$ to $C_{20}$ alkyl, $C_4$ to $C_{10}$ cyclo-alkyl, $C_6$-$C_{12}$ aryl, $C_7$-$C_{12}$ arylalkyl, or trimethylsilyl, with the proviso that both R'-residues are selected from the above stated group and both R'-residues are chemically different.

Due to the use of the catalyst system with a very low surface area comprising the specific catalyst the manufacture of the above defined polypropylene is possible.

Furthermore it is preferred, that the catalyst system has a surface area of lower than 15 m²/g, yet still lower than 10 m²/g and most preferred lower than 5 m²/g. The surface area according to this invention is measured according to ASTM D 3663 (N₂).

Additionally it is appreciated that the catalyst system has a porosity of less than 1.40 ml/g, more preferably less than 1.30 ml/g and most preferably less than 1.00 ml/g. The porosity has been measured according to ASTM 4641 ($N_2$). In another preferred embodiment the porosity is not detectable when determined with the method applied according to ASTM 4641 ($N_2$).

It is in particular preferred that the porosity not detectable when applying the method according to ASTM 4641 ($N_2$) and has a surface area measured according ASTM D 3663 ($N_2$) of less than 5 m²/g The term "δ-ligand" is understood in the whole description in a known manner, i.e. a group bonded to the metal at one or more places via a sigma bond. A preferred monovalent anionic ligand is halogen, in particular chlorine (Cl).

Preferably, the catalyst is of formula (I) indicated above, wherein each X is chlorine (Cl) and/or both identical Cp-ligands are substituted.

The optional one or more substituent(s) bonded to cyclopentadienyl, indenyl, tetrahydroindenyl, or fluorenyl may be selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_{13}$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both identical Cp-ligands are indenyl moieties wherein each indenyl moiety bear one or two substituents as defined above. More preferably each of the identical Cp-ligands is an indenyl moiety bearing two substituents as defined above, with the proviso that the substituents are chosen in such are manner that both Cp-ligands are of the same chemical structure, i.e. both Cp-ligands have the same substituents bonded to chemically the same indenyl moiety.

Still more preferably both identical Cp-ligands are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp-ligands are of the same chemical structure, i.e. both Cp-ligands have the same substituents bonded to chemically the same indenyl moiety.

Still more preferred both identical Cp-ligands are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with proviso that the indenyl moieties of both Cp-ligands are of the same chemical structure, i.e. both Cp-ligands have the same substituents bonded to chemically the same indenyl moiety.

Yet more preferably both identical Cp-ligands are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, preferably is methyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp-ligands are of the same chemical structure, i.e. both Cp-ligands have the same substituents bonded to chemically the same indenyl moiety.

It is in particular appreciated that both identical Cp-ligands are indenyl moieties wherein the indenyl moieties comprise at the five membered ring of the indenyl moiety at the 2-position a substituent and at the six membered ring of the indenyl moiety at the 4-position a further substituent, wherein the substituent of the five membered ring is selected from the group consisting of methyl, ethyl and isopropyl, and the further substituent of the six membered ring is selected from the group consisting of phenyl, $C_1$-$C_6$ alkyl substituted phenyl, naphthyl, and $C_1$-$C_6$ alkyl substituted naphthyl, with proviso that the indenyl moieties of both Cp-ligands are of the same chemical structure, i.e. both Cp-ligands have the same substituents bonded to chemically the same indenyl moiety.

Concerning the linking group "R" of formula (II)

$$—Y(R')_2— \tag{II}$$

it is preferred that
Y is Si
R' is $C_1$ to $C_{10}$ alkyl, $C_4$ to $C_{10}$ cyclo-alkyl, or $C_6$-$C_{12}$ aryl, with the proviso that both R'-residues are selected from the above stated group and both R'-residues are chemically different.

Accordingly in a specific embodiment the catalyst is of formula (III)

$$(Cp)_2RZrCl_2 \tag{III}$$

wherein
Cp is a substituted indenyl with a substituent at the 2-position of the five membered ring and a substituent at the 4-position of the six membered ring, wherein the substituent of the five membered ring is methyl or ethyl and the substituent of the six membered ring is $C_1$-$C_6$ alkyl substituted phenyl, like 4-methyl-phenyl,
with the proviso that both Cp-ligands are chemically the same, i.e. are identical,
R is a bridging group linking the two Cp ligands, wherein R has the formula (IV)

$$—Si(R')_2— \tag{IV}$$

wherein
R' is selected from the group consisting of methyl, ethyl, iso-propyl, cyclo-hexyl, 4-$C_1$ to $C_{10}$ alkyl cyclo-hexyl, like 4-methyl-cyclo-hexyl,
with the proviso that both R'-residues are selected from the above stated group and both R'-residues are chemically different.

In an especially preferred embodiment the catalyst is rac-methyl(cyclohexyl)silanediyl bis(2-methyl-4-(4-tert-butylphenyl)indenyl)zirconium dichloride. More preferred said catalyst is not non-silica supported.

The above described catalyst system is prepared according to the methods described in WO 01/48034.

It is in particular preferred that the catalyst system is obtainable by the emulsion solidification technology as described in WO 03/051934. This document is herewith included in its entirety by reference. Hence the catalyst system is preferably in the form of solid catalyst particles, obtainable by a process comprising the steps of a) preparing a solution of one or more catalyst components;
b) dispersing said solution in a solvent immiscible therewith to form an emulsion in which said one or more catalyst components are present in the droplets of the dispersed phase,
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m²/g, still more preferably less than 20 m²/g, yet more preferably less than 15 m²/g, yet still more preferably less than 10 m²/g and most preferably less than 5 m²/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

The above described symmetric catalyst components are prepared according to the methods described in WO 01/48034.

As mentioned above the catalyst system may further comprise an activator as a cocatalyst, as described in WO 03/051934, which is enclosed herein with reference.

Preferred as cocatalysts for metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.e. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention is related to the use of the above-defined catalyst system for the production of a polypropylene according to this invention.

In addition, the present invention is related to the process for producing the inventive polypropylene, whereby the catalyst system as defined above is employed. Furthermore it is preferred that the process temperature is higher than 60° C. The process may be performed as a multi-stage process to obtain multimodal polypropylene as defined above. However in the present invention a multimodal (bimodal) polypropylene is obtained by blending polypropylenes of different melt flow rates and/or different number average molecular weights (Mn). The different polypropylenes are produced in a bulk reactor and are subsequently blended.

Accordingly it is in particular appreciated that the inventive polypropylene is a (mechanical) blend of at least two polypropylenes which differ in their melt flow rates and/or in their number average molecular weights (Mn).

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to this invention is produced preferably in a multi-stage process in a multi-stage reaction sequence as described in WO 92/12182. The contents of this document are included herein by reference.

It has previously been known to produce multimodal, in particular bimodal, polypropylene in two or more reactors connected in series, i.e. in different steps (a) and (b).

According to the present invention, the main polymerization stages are preferably carried out as a combination of a bulk polymerization/gas phase polymerization.

The bulk polymerizations are preferably performed in a so-called loop reactor.

In order to produce the multimodal polypropylene according to this invention, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a).

The process is preferably a continuous process.

Preferably, in the process for producing the propylene polymer as defined above the conditions for the bulk reactor of step (a) may be as follows:
the temperature is within the range of 40° C. to 110° C., preferably between 60° C. and 100° C., 70 to 90° C.,
the pressure is within the range of 20 bar to 80 bar, preferably between 30 bar to 60 bar,
hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The process of the invention or any embodiments thereof above enable highly feasible means for producing and further tailoring the propylene polymer composition within the invention, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made polypropylene as defined above.

The capacitor film can be prepared by conventional drawing processes known in the art. Accordingly the process for the manufacture of a capacitor film according to this invention comprises the use of the polypropylene as defined herein and its forming into a film preferably by the tenter method known in the art.

The tenter method is in particular a method in which the polypropylene as defined herein is melt extruded from a slit die such as a T-die and cooled on a cooling drum obtaining an undrawn sheet. Said sheet is pre-heated for example with a heated metal roll and then drawn in the length direction between a plurality of rolls over which a difference in peripheral speeds is established and then both edges are gripped with grippers and the sheet is drawn in the transverse direction in an oven by means of a tenter resulting in a biaxially drawn film. The temperature of said stretched sheet during the longitudinal drawing is preferably controlled in such a way as to be within the temperature range of the melting point of the polypropylene as defined herein (−15 or +5° C.). The uniformity of the film thickness on transverse drawing can be evaluated with the method in which a fixed region on the film is masked after drawing in the length direction and measuring the actual drawing factor by measuring the spacing of the said masking after transverse drawing.

Subsequently, the film can treated by corona discharge in air, nitrogen, carbon dioxide gas or any of the mixtures on the surface to be metalized, to improve the adhesive strength to the metal to be deposited, and wound by a winder.

The obtained film can set in a vacuum metallizer, and the film is preferably coated with an oil to form an insulation groove suitable for the purpose concerned, using a gravure coater, etc. Then, the metal suitable for the purpose concerned is deposited to achieve a predetermined layer resistance. Furthermore, as required, metallization is carried out through a comb-shaped deposition preventive plate to continuously change the resistance value in the transverse direction of the film. The metalized film is slit, to make two metalized reels as a pair for making a capacitor device. Then, the reels are wound to form a device and the device is formed to be flat by a thermal press, being followed by metal spraying at the ends, attaching of leads, as required impregnation with an insulating oil, and packaging to make a capacitor.

Moreover the present invention is directed to the use of the capacitor film as defined herein in a capacitor.

In addition, the present invention is directed to a capacitor comprising at least on layer comprising a capacitor film as defined herein. Additionally it is preferred that the capacitor comprises a metal layer, in particular a metal layer obtained by the above described process.

The present invention will now be described in further detail by the following examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C$ $\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun 2007, 28, 11289). A total of 8192 (8 k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

$$[21e]\text{ mol }\% = 100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E\text{ [mol \%]} = 100*fE$$

The weight percent comonomer incorporation in the polymer was calculated from the mole fraction according to:

$$E\text{ [wt \%]} = 100*(fE*28.05)/((fE*28.05) + ((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX [mol\%] = 100 * fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX = fEEE + fPEE + fPEP$$

$$fXPX = fPPP + fEPP + fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E) [\%] = 100 * (fPEP/fXEX)$$

Characteristic signals corresponding to the incorporation of 1-hexene were observed, and the 1-hexene content was calculated as the mole percent of 1-hexene in the polymer, H (mol %), according to:

$$[H] = H_{tot}/(P_{tot} + H_{tot})$$

where:

$$H_{tot} = I(\alpha B_4)/2 + I(\alpha\alpha B_4) \times 2$$

where $I(\alpha B_4)$ is the integral of the $\alpha B_4$ sites at 44.1 ppm, which identifies the isolated 1-hexene incorporated in PPHPP sequences, and $I(\alpha\alpha B_4)$ is the integral of the $\alpha\alpha B_4$ sites at 41.6 ppm, which identifies the consecutively incorporated 1-hexene in PPHHPP sequences. $P_{tot}$=Integral of all CH3 areas on the methyl region with correction applied for underestimation of other propene units not accounted for in this region and overestimation due to other sites found in this region.

and $H(mol\%) = 100 \times [H]$ which is then converted into wt % using the correlation $$H(wt\%) = (100 \times H \text{ mol}\% \times 84.16)/(H \text{ mol}\% \times 84.16 + (100 - H \text{ mol}\%) \times 42.08)$$

A statistical distribution is suggested from the relationship between the content of hexene present in isolated (PPHPP) and consecutive (PPHHPP) incorporated comonomer sequences:

$$[HH] < [H]^2$$

Molecular Weight Averages, Molecular Weight Distribution, Branching Index (Mn, Mw, MWD, g') Determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methylphenol) as mobile phase at 160° C. and at a constant flow rate of 1 mL/min was applied. 200 μL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm³/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the $Mw_i$ at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, $2^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as $g' = [\eta]_{br}/[\eta]_{lin}$. It is well known if the g' value increases the branching content decreases. $[\eta]$ is the intrinsic viscosity at 160° C. in trichloorbenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector.

$[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_o^i a_i * \frac{[\eta]_{br,i}}{[\eta]_{lin,i}}}{\sum a_i}$$

-continued $$g'_w = \frac{\sum_{o}^{i} A_i * \frac{[\eta]_{br,i}}{[\eta]_{lin,i}}}{\sum_{o}^{i} A_i * \left(\frac{[\eta]_{br,i}}{[\eta]_{lin,i}}\right)^2}$$

where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^\alpha$. $[\eta]_{br,i}$ was measured for each particular sample by online viscosity and concentration detector.

Mz, Mw, Mn, MWD

Mz/Mw/Mn/MWD are measured by Gel Permeation Chromatography (GPC) according to the following method:

The weight average molecular weight (Mw), the z-average molecular weight (Mz), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg.

Xylene Cold Soluble Fraction (XCS Wt %)

The xylene cold soluble fraction (XCS) is determined at 23° C. according to ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Elementary Analysis

The below described elementary analysis is used for determining the content of elementary residues which are mainly originating from the catalyst, especially the Al-, B-, and Si-residues in the polymer. Said Al-, B- and Si-residues can be in any form, e.g. in elementary or ionic form, which can be recovered and detected from polypropylene using the below described ICP-method. The method can also be used for determining the Ti-content of the polymer. It is understood that also other known methods can be used which would result in similar results.

ICP-Spectrometry (Inductively Coupled Plasma Emission)

ICP-instrument: The instrument for determination of Al-, B- and Si-content is ICP Optima 2000 DV, PSN 620785 (supplier Perkin Elmer Instruments, Belgium) with software of the instrument.

Detection limits are 0.10 ppm (Al), 0.10 ppm (B), 0.10 ppm (Si).

The polymer sample was first ashed in a known manner, then dissolved in an appropriate acidic solvent. The dilutions of the standards for the calibration curve are dissolved in the same solvent as the sample and the concentrations chosen so that the concentration of the sample would fall within the standard calibration curve.

ppm: means parts per million by weight

Ash content: Ash content is measured according to ISO 3451-1 (1997) standard.

Calculated ash, Al- Si- and B-content:

The ash and the above listed elements, Al and/or Si and/or B can also be calculated form a polypropylene based on the polymerization activity of the catalyst as exemplified in the examples. These values would give the upper limit of the presence of said residues originating from the catalyst.

Thus the estimate catalyst residue is based on catalyst composition and polymerization productivity, catalyst residues in the polymer can be estimated according to:

Total catalyst residues [ppm]=1/productivity [kg$_{pp}$/g$_{catalyst}$]×100

Al residues [ppm]=$w_{Al,catalyst}$ [%]×total catalyst residues [ppm]/100

Zr residues [ppm]=$w_{Zr,catalyst}$ [%]×total catalyst residues [ppm]/100

(Similar calculations apply also for B, Cl and Si residues)

Chlorine residues content: The content of Cl-residues is measured from samples in the known manner using X-ray fluorescence (XRF) spectrometry. The instrument was X-ray fluorescention Philips PW2400, PSN 620487, (Supplier: Philips, Belgium) software X47. Detection limit for Cl is 1 ppm.

Electrical Breakdown Strength (EB63%)

It follows standard IEC 60243-1, Second edition (1998-01).

The method describes a way to measure the electrical breakdown strength for insulation materials on compression moulded plaques.

Definition:

Eb: $E_b$–$U_b$/d

The electrical field strength in the test sample at which breakdown occurs. In homogeneous plaques and films this corresponds to the electrical electrical breakdown strength divided by the thickness of the plaque/film (d), unit: kV/mm. The electrical breakdown strength is determined at 50 Hz within a high voltage cabinet using metal rods as electrodes as described in IEC 60243-1, Second edition (1998-01) (4.1.2). The voltage is raised over the film/plaque at 2 kV/s until a breakdown occurs. For each BOPP film, 10 individual breakdown measurements are performed. The 10 individual breakdown results per BOPP film are evaluated using a Weibull plot, wherein the 63 percentile corresponds to the breakdown strength (Eb63%) of the BOPP film. The β-parameter is the slope of the linear regression curve through these 10 points (see also CEI 727-2; First Edition (1993-02)).

Porosity:

BET with $N_2$ gas, ASTM 4641, apparatus Micromeritics Tristar 3000; sample preparation: at a temperature of 50° C., 6 hours in vacuum.

Surface Area:

BET with $N_2$ gas ASTM D 3663, apparatus Micromeritics Tristar 3000: sample preparation at a temperature of 50° C., 6 hours in vacuum.

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down at a rate of 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

The melting curve of the material crystallised this way can be used for calculating the lamella thickness distribution according to Thomson-Gibbs equation (Eq 1.).

$$T_m = T_0\left(1 - \frac{2\sigma}{\Delta H_0 \cdot L}\right) \quad (1)$$

where $T_0$=457K, $\Delta H_0$=134×10$^6$ J/m$^3$, σ=0,049.6 J/m$^2$ and L is the lamella thickness.

B. Examples

The used catalyst was prepared according to example 5 of WO 03/051934 wherein the catalyst used therein was replaced by rac-methyl(cyclohexyl)silanediyl bis(2-methyl-4-(4-tert-butylphenyl)indenyl)zirconium dichloride. Rac-methyl(cyclohexyl)silanediyl bis(2-methyl-4-(4-tert-butylphenyl)indenyl)zirconium dichloride was prepared according to WO 2005 105863 A2, examples 17-18.

Catalyst Preparation

In a jacketed 90 dm$^3$ glasslined stainless steel reactor the complex solution was prepared at −5° C. adding 0.85 kg of a 24.5 wt % ((2,2,3,3,4,4,5,5,6,6,7,7,8,8,9,9,9-heptadecafluorononyl)oxirane)/toluene solution very slowly (3.4 ml/min) to 13.5 kg 30 wt % MAO (methylaluminoxane)/toluene solution. The temperature was increased to 25° C. and the solution was stirred for 60 minutes. After addition of 210 g of the complex the solution was stirred for an additional two hours. That mixture was pumped at 5 l/h to the rotor stator with the rotor stator pair 4M. In the rotor stator with a tip speed of 4 m/s the mixture was mixed with a flow of 32 l/h of hexadecafluoro-1,3-dimethylcyclohexane thus forming an emulsion. The droplets in the emulsion were solidified by an excess flow of 450 l/h hexadecafluoro-1,3-dimethylcyclohexane at a temperature of 76° C. in a Teflon hose. The hose was connected to a jacketed 160 dm$^3$ stainless steel reactor equipped with a helical mixing element. In this reactor the catalyst particles were separated from the hexadecafluoro-1,3-dimethylcyclohexane by density difference. After the complex solution had been utilised the catalyst particles were dried in the 160 dm$^3$ reactor at a temperature of 70° C. and a nitrogen flow of 5 kg/h for 7 h.

Porosity and surface area below the detection limit.

mol ratio Co/M (Al/Zr): 260 mol/mol

Mean particle size: 26 μm

Zr content: 0.53 wt-%

Al content: 34.5 wt-%

CE2, E1 and E2 used in this invention are melt blends consisting of base polymers reported in table 1. CE1 and E3 are the pure base polymers from table 1. The base polymers were produced using above mentioned catalyst in a continuous single step bulk polymerization process (loop reactor), without a gas phase polymerization step, but including the prepolymerization of the catalyst in a loop-type prepolymerization reactor. The catalyst suspension and propylene was continuously fed to the prepolymerization loop reactor which was operated at a temperature of 25° C. and a pressure of 50 bar. The residence time in the prepolymerization was between 15 and 30 minutes. Hydrogen feed (g/h) was adjusted to reach the desired MFR (Table 1). The same hydrogen feed was used in the prepolymerization and the loop reactor. The temperature and pressure in the loop reactor were 75° C. and 55 bar respectively. The samples shown in table 1 were collected after the loop reactor.

TABLE 1

Properties of the individual components

|  | MFR [g/10 min] | Mw [kg/mol] | Mz [kg/mol] | MWD [Mz/Mn] |
|---|---|---|---|---|
| SSCPP1 | 0.8 | 364 | 652 | 3.6 |
| SSCPP2 | 1.8 | 295 | 519 | 2.5 |
| SSCPP3 | 8.2 | 207 | 372 | 2.5 |
| SSCPP4 | 90 | 120 | 216 | 2.6 |

Table 2 shows the blending recipe used to generate the melt blends. CE1 and E3 are the pure base polymers from table 1.

TABLE 2

Blends obtained by the different polypropylenes

| Base resin | CE1 | CE2 | E1 | E2 | E3 |
|---|---|---|---|---|---|
| SSCPP1 | 0 | 20 | 0 | 45 | 0 |
| SSCPP2 | 99.55 | 59.55 | 49.55 | 24.55 | 0 |
| SSCPP3 | 0 | 20 | 50 | 10 | 99.55 |

TABLE 2-continued

Blends obtained by the different polypropylenes

| Base resin | CE1 | CE2 | E1 | E2 | E3 |
|---|---|---|---|---|---|
| SSCPP4 | 0 | 0 | 0 | 20 | 0 |
| Irganox 1010 | 4.5 | 4.5 | 4.5 | 4.5 | 4.5 |

Meltblending was performed on pre mixed and pre stabilized polymer powder with an ZSK 18 extruder.

Comparative Example 3

(CE 3) is the commercial product HB311BF of Borealis AG CE1, CE2, CE3, E1, E2 and E3 were subjected to the following work flow to create the BOPP films: The materials were extruded and cast onto a chill roll to generate quenched film sheets. Settings used were according to table 3

TABLE 3

Cast Film process parameters

| Extruder | Melt temperature | Chill roll temperature | Cast film thickness |
|---|---|---|---|
| Brabender single screw, 19 mm, 1:3 conical screw design, screen pack | 230° C. | 90° C. | 500 μm |

From each cast film, specimens of size 8.5 by 8.5 cm were cut from the central area of the film. These specimens were subjected to a biaxial orientation process on a laboratory BOPP machine. The square sized specimens were fixed in the stretching frame of the Karo IV stretcher by five clamps on each side. The stretching frame extends and stretches the cast film by a factor of five on each side, the draw ratio is thus 5×5. After the stretching process at given settings, the BOPP film was released from the stretching frame and subjected to the breakdown testing as described. The workflow just described, i.e cast film making, biaxial orientation and including the breakdown testing was repeated for each material. The reported final breakdown strengths (BDV; Eb63%) in table 5 are averages from the two independent measurements. The two BOPP films were statistically treated as one film; Eb63% was obtained using 10+10 measured breakdown voltages (Eb, kV/mm).

TABLE 4

BOPP process parameters

| Biaxial orientation machine | Stretching temp. | Stretching speed | BOPP film thickness | Draw ratio |
|---|---|---|---|---|
| Karo IV Laboratory Stretcher, Brückner Maschinenbau GmbH, Germany | 147° C./ 157° C.* | 800%/s | 20 μm | 5 × 5 |

*147° C. was used for CE1, CE2, E1 and E2; 157° C. was used for CE3

TABLE 5

Properties

| | | CE 1 | CE 2 | CE 3 | E 1 | E 2 | E 3 |
|---|---|---|---|---|---|---|---|
| Mw | [kg/mol] | 295 | 319 | 406 | 258 | 303 | 207 |
| Mn | [kg/mol] | 114 | 110 | 101 | 99 | 89 | 83 |
| Mz | [kg/mol] | 519 | 600 | 1250 | 475 | 607 | 372 |
| MWD | [—] | 2.6 | 2.9 | 7.0 | 2.6 | 3.4 | 2.5 |
| Mz/Mn | [—] | 4.6 | 5.5 | 12.3 | 4.8 | 6.8 | 4.5 |
| Mz/Mw | [—] | 1.6 | 1.9 | 3.1 | 1.8 | 2.0 | 1.8 |
| MFR2 | [g/10 min] | 1.7 | 1.8 | 2.2 | 3.7 | 2.3 | 8.2 |
| XCS | [wt.-%] | 1.4 | 1.4 | 3.5 | 1.2 | 1.3 | 1.4 |
| XHI | [wt.-%] | 0.0 | 0.0 | 0.0 | 0.0 | 0.0 | 0.0 |
| Tm | [° C.] | 152.7 | 153 | 161 | 152.5 | 153.6 | 152.9 |
| Tc | [° C.] | 115.0 | 114.6 | 113.1 | 115.1 | 115.8 | 115.4 |
| g' | [—] | 0.959 | 0.963 | 0.987 | 0.970 | 0.990 | 0.956 |
| Ash | [ppm] | 118 | 60 | 20 | 76 | 92 | 55 |
| Si | [ppm] | <0.5 | <0.5 | <0.5 | <0.5 | <0.5 | <0.5 |
| Ti | [ppm] | <0.5 | <0.5 | 1.5 | <0.5 | <0.5 | <0.5 |
| Cl | [ppm] | <0.5 | <0.5 | <0.5 | <0.5 | <0.5 | <0.5 |
| Mg | [ppm] | <0.5 | <0.5 | 1.5 | <0.5 | <0.5 | <0.5 |
| <2,1> | [mol-%] | 0.9 | 0.9 | 0 | 0.9 | 0.9 | 0.9 |
| BDV (Eb63%) | [kV/mm] | 289 | 292 | 319 | 325 | 328 | 334 |
| β | [—] | 13 | 18 | 11 | 13 | 16 | 14 |
| Film Thickness | [μm] | 20 | 20 | 20 | 20 | 20 | 20 |

<2,1> are the <2,1> regiodefects

Electrical breakdown strength (EB63%) was measured according to IEC 60243-1

TABLE 6

SIST of E 2

| T Range [° C.] | Lc range [nm] | Δ H [J/g] | Fraction [wt.-%] |
|---|---|---|---|
| 50-60 | 2.52-2.73 | 0.07268 | 0.1 |
| 60-70 | 2.74-2.97 | 0.3826 | 0.3 |
| 70-80 | 2.98-3.25 | 0.7062 | 0.6 |
| 80-90 | 3.26-3.60 | 1.091 | 1.0 |
| 90-100 | 3.61-4.03 | 1.456 | 1.3 |
| 100-110 | 4.04-4.57 | 1.626 | 1.5 |
| 110-120 | 4.58-5.28 | 2.878 | 2.6 |
| 120-130 | 5.29-6.26 | 3.785 | 3.5 |
| 130-140 | 6.27-7.69 | 9.974 | 9.1 |
| 140-150 | 7.70-9.95 | 29.63 | 27.0 |
| 150-160 | 9.96-14.09 | 32.98 | 30.1 |
| >160 | >14.09 | 25.14 | 22.9 |

TABLE 7

| | SIST of E 3 | | |
|---|---|---|---|
| T Range [° C.] | Lc range [nm] | Δ H [J/g] | Fraction [wt.-%] |
| 50-60 | 2.52-2.73 | 0.01374 | 0.0 |
| 60-70 | 2.74-2.97 | 0.06661 | 0.0 |
| 70-80 | 2.98-3.25 | 0.2127 | 0.21 |
| 80-90 | 3.26-3.60 | 0.4246 | 0.4 |
| 90-100 | 3.61-4.03 | 0.6898 | 0.7 |
| 100-110 | 4.04-4.57 | 0.9284 | 0.9 |
| 110-120 | 4.58-5.28 | 2.095 | 2.1 |
| 120-130 | 5.29-6.26 | 3.053 | 3.0 |
| 130-140 | 6.27-7.69 | 7.782 | 7.7 |
| 140-150 | 7.70-9.95 | 27.25 | 27.1 |
| 150-160 | 9.96-14.09 | 32.99 | 32.8 |
| >160 | >14.09 | 24.9 | 24.8 |

We claim:

1. Polypropylene comprising:
   (a) a melting temperature ($T_m$) measured according to ISO 11357-3 of at least 151.0° C.,
   (b) a melt flow rate $MFR_2$ (230° C.) measured according to ISO 1133 of more than 2.0 g/10 min,
   (c) a xylene cold soluble fraction (XCS) measured according to ISO 6427 at 23° C. of not more than 1.5 wt-%,
   (d) a number average molecular weight (Mn) measured according to ISO 16014-4:2003 of not more than 110 kg/mol
   and wherein said polypropylene further has
   (e2) <2,1> regiodefects of equal or more than 0.4 mol-% determined by $^{13}$C-spectroscopy,
   and
   (e1) a melting temperature ($T_m$) measured according to ISO 11357-3 of equal or below 159° C.,
   and/or
   (e3) 45.0 to 67.0 wt-% of a crystalline fraction having a lamella thickness in the range of 7.70 to 14.09 nm wherein said fraction is determined by the stepwise isothermal segregation technique (SIST),
   and/or
   (e4) 18.0 to 50.0 wt-% of a crystalline fraction having a lamella thickness of more than 14.09 nm wherein said fraction is determined by the stepwise isothermal segregation technique (SIST).

2. Polypropylene according to claim 1, wherein the polypropylene has
   (a) an Mz/Mn-ratio of below 8.0,
   and/or
   (b) an Mz/Mw-ratio of below 3.0,
   wherein Mw is the weight average molecular weight, Mz is the z-average molecular weight, and Mn is the number average molecular weight, all measured according to ISO 16014-4:2003.

3. Polypropylene according to claim 1, wherein the polypropylene comprises
   (a) a first polypropylene having
      (i) a melt flow rate $MFR_2$ (230° C.) measured according to ISO 1133 of below 5.0 g/10 min,
      and/or
      (ii) a number average molecular weight (Mn) measured according to ISO 16014-4:2003 of at least 95 kg/mol,
   and
   (b) a second polypropylene having
      (i) a melt flow rate $MFR_2$ (230° C.) measured according to ISO 1133 of at least 5.0 g/10 min,
      and/or
      (ii) a number average molecular weight (Mn) measured according to ISO 16014-4:2003 of below 95 kg/mol.

4. Polypropylene according to claim 1, wherein the polypropylene has
   (a) an ash content measured according to ISO 3451-1 (1997) in the range of 50 to 80 ppm, and/or
   (b) an electrical breakdown strength (EB63%, AC, 50 Hz) according to IEC 60243-part 1 (1998) of at least 300 kV/mm at a draw ratio in machine direction and in transverse direction of 5.0.

5. Polypropylene according to claim 1, wherein the polypropylene has
   (a) a magnesium (Mg) residue content measured according to ISO 3451-1 (1997) of not more than 0.5 ppm and/or
   (b) a silicon (Si) residue content measured according to ISO 3451-1 (1997) of not more than 10 ppm and/or
   (c) a chlorine (Cl) residue content measured according to ISO 3451-1 (1997) of not more than 5 ppm.

6. Polypropylene according to claim 1, wherein the polypropylene is a propylene homopolymer.

7. Polypropylene according to claim 1, wherein the polypropylene
   (a) has molecular weight distribution (MWD) measured according to ISO 16014 of at least 2.3,
   and/or
   (b) a branching index g' of at least 0.9.

8. Polypropylene according to claim 1, wherein the polypropylene has crystallization temperature ($T_c$) measured according to ISO 11357-3 of at least 113° C.

9. Polypropylene according to claim 1, wherein the polypropylene is a biaxially oriented film.

10. Polypropylene according to claim 1, wherein the polypropylene has a branching index g' of at least 0.95.

11. Polypropylene comprising:
    (a) a melting temperature ($T_m$) measured according to ISO 11357-3 of at least 151.0° C.,
    (b) a melt flow rate $MFR_2$ (230° C.) measured according to ISO 1133 of more than 2.0 g/10 min,
    (c) a xylene cold soluble fraction (XCS) measured according to ISO 6427 at 23° C. of not more than 1.5 wt-%,
    (d) at least 18.0 wt-% of a crystalline fraction having a lamella thickness of more than 14.09 nm, wherein said fraction is determined by the stepwise isothermal segregation technique (SIST),
    and wherein said polypropylene further has
    (e2) <2,1> regiodefects of equal or more than 0.4 mol-% determined by $^{13}$C-spectroscopy,
    and
    (e1) a melting temperature ($T_m$) measured according to ISO 11357-3 of equal or below 159° C.,
    and/or
    (e3) 45.0 to 67.0 wt-% of a crystalline fraction having a lamella thickness in the range of 7.70 to 14.09 nm wherein said fraction is determined by the stepwise isothermal segregation technique (SIST).

12. Polypropylene according to claim 11, wherein the polypropylene has
    (a) a number average molecular weight (Mn) measured according to ISO 16014-4:2003 of not more than 110 kg/mol,
    and/or
    (b) 18.0 to 50.0 wt-% of a crystalline fraction having a lamella thickness of more than 14.09 nm wherein said fraction is determined by the stepwise isothermal segregation technique (SIST).

13. Biaxially oriented polypropylene film, wherein the polypropylene comprises:

a melting temperature $T_m$ measured according to ISO 11357-3 of at least 151.0° C., (b) a melt flow rate $MFR_2$ (230° C.) measured according to ISO 1133 of more than 2.0 g/10 min, (c) a xylene cold soluble fraction (XCS) measured according to ISO 6427 at 23° C. of not more than 1.5 wt-%, (d) a number average molecular weight (Mn) measured according to ISO 16014-4:2003 of not more than 110 kg/mol and wherein said polypropylene further has (e2) <2,1> regiodefects of equal or more than 0.4 mol-% determined by $^{13}C$-spectroscopy, and (e1) a melting temperature ($T_m$) measured according to ISO 11357-3 of equal or below 159° C., and/or (e3) 45.0 to 67.0 wt-% of a crystalline fraction having a lamella thickness in the range of 7.70 to 14.09 nm wherein said fraction is determined by the stepwise isothermal segregation technique (SIST), and/or (e4) 18.0 to 50.0 wt-% of a crystalline fraction having a lamella thickness of more than 14.09 nm wherein said fraction is determined by the stepwise isothermal segregation technique (SIST).

14. Capacitor film comprising a polypropylene or a biaxially oriented polypropylene said polypropylene comprising:

(a) a melting temperature ($T_m$) measured according to ISO 11357-3 of at least 151.0° C., (b) a melt flow rate $MFR_2$ (230° C.) measured according to ISO 1133 of more than 2.0 g/10 min, (c) a xylene cold soluble fraction (XCS) measured according to ISO 6427 at 23° C. of not more than 1.5 wt-%, (d) a number average molecular weight (Mn) measured according to ISO 16014-4:2003 of not more than 110 kg/mol and wherein said polypropylene further has (e2) <2,1> regiodefects of equal or more than 0.4 mol-% determined by $^{13}C$-spectroscopy, and (e1) a melting temperature ($T_m$) measured according to ISO 11357-3 of equal or below 159° C., and/or (e3) 45.0 to 67.0 wt-% of a crystalline fraction having a lamella thickness in the range of 7.70 to 14.09 nm wherein said fraction is determined by the stepwise isothermal segregation technique (SIST), and/or (e4) 18.0 to 50.0 wt-% of a crystalline fraction having a lamella thickness of more than 14.09 nm wherein said fraction is determined by the stepwise isothermal segregation technique (SIST).

15. Process for the preparation of a polypropylene, wherein the process comprises the step of polymerizing propylene and optionally a C2 to C10 α-olefin different to propylene in the presence of a catalyst system having a surface area measured according to ASTM D 3663 of below 20 m²/g and comprising a catalyst being the transition metal compound of formula (I)

$$(Cp)_2RZrX_2 \qquad (I)$$

wherein

X is independently a monovalent anionic ligand, such as a σ-ligand,

Cp is an organic ligand selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, with the proviso that both Cp-ligands are selected from the above stated group and both Cp-ligands are chemically the same, R is a bridging group linking the two Cp ligands, wherein R has the formula (II)

$$—Y(R')_2— \qquad (II)$$

wherein

Y is C, Si or Ge,

R' is $C_1$ to $C_{20}$ alkyl, $C_4$ to $C_{10}$ cyclo-alkyl, $C_6$-$C_{12}$ aryl, $C_7$-$C_{12}$ arylalkyl, or trimethylsilyl, with the proviso that both R'-residues are selected from the above stated group and both R'-residues are chemically different said polypropylene having (a) a melting temperature ($T_m$) measured according to ISO 11357-3 of at least 151.0° C., (b) a melt flow rate $MFR_2$ (230° C.) measured according to ISO 1133 of more than 2.0 g/10 min, (c) a xylene cold soluble fraction (XCS) measured according to ISO 6427 at 23° C. of not more than 1.5 wt-%, (d) a number average molecular weight (Mn) measured according to ISO 16014-4:2003 of not more than 110 kg/mol and wherein said polypropylene further has (e2) <2,1> regiodefects of equal or more than 0.4 mol-% determined by $^{13}C$-spectroscopy, and (e1) a melting temperature ($T_m$) measured according to ISO 11357-3 of equal or below 159° C., and/or (e3) 45.0 to 67.0 wt-% of a crystalline fraction having a lamella thickness in the range of 7.70 to 14.09 nm wherein said fraction is determined by the stepwise isothermal segregation technique (SIST), and/or (e4) 18.0 to 50.0 wt-% of a crystalline fraction having a lamella thickness of more than 14.09 nm wherein said fraction is determined by the stepwise isothermal segregation technique (SIST).

16. Process for the preparation of a polypropylene according to claim 15, wherein Y is Si.

* * * * *